United States Patent
Ward

(10) Patent No.: US 9,341,254 B2
(45) Date of Patent: May 17, 2016

(54) ISOLATING PULLEY

(71) Applicant: THE GATES CORPORATION, Denver, CO (US)

(72) Inventor: Peter A. Ward, Farmington Hills, MI (US)

(73) Assignee: GATES CORPORATION, Denver, CO (US)

( * ) Notice: Subject to any disclaimer, the term of this patent is extended or adjusted under 35 U.S.C. 154(b) by 179 days.

(21) Appl. No.: 14/455,067

(22) Filed: Aug. 8, 2014

(65) Prior Publication Data

US 2016/0040771 A1    Feb. 11, 2016

(51) Int. Cl.

| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F16H 55/38* | (2006.01) |
| *F16D 41/20* | (2006.01) |

(52) U.S. Cl.
CPC .............. *F16H 55/38* (2013.01); *F16D 41/206* (2013.01); *F16H 55/36* (2013.01); *F16H 2055/366* (2013.01)

(58) Field of Classification Search
CPC ..... F16H 55/36; F16H 55/366; F16D 41/206; F16D 7/022; F02B 67/06
USPC ........................................ 474/70, 94
See application file for complete search history.

(56) References Cited

U.S. PATENT DOCUMENTS

| | | | | |
|---|---|---|---|---|
| 5,139,463 | A * | 8/1992 | Bytzek ...................... | F16D 3/52 474/69 |
| 6,083,130 | A * | 7/2000 | Mevissen ................ | F02B 67/06 192/107 T |
| 7,153,227 | B2 * | 12/2006 | Dell ......................... | F16H 55/36 474/70 |
| 7,618,337 | B2 * | 11/2009 | Jansen ..................... | F02B 67/06 192/41 S |
| 7,712,592 | B2 * | 5/2010 | Jansen ...................... | F16D 3/52 192/41 S |
| 7,891,475 | B2 * | 2/2011 | Zhu ......................... | F16D 41/22 192/54.5 |
| 7,975,821 | B2 * | 7/2011 | Antchak ................. | F16D 7/022 192/41 S |

(Continued)

OTHER PUBLICATIONS

European Patent Office, International Search Report, application No. PCT/US2015/043629, mailing date Jan. 18, 2016.

*Primary Examiner* — Henry Liu
(74) *Attorney, Agent, or Firm* — Jeffrey A. Thurnau, Esq.; Paul N. Dunlap, Esq.

(57) ABSTRACT

An isolating pulley comprising a hub, a pulley journalled to the hub, a spring carrier journalled to the hub, a torsion spring engaged between the pulley and the spring carrier, a friction-member engaged between the spring carrier and the hub, the frictionmember comprising a first multiple ribbed surface to engage the spring carrier and a second multiple ribbed surface to engage the hub, and the first multiple ribbed surface and the second multiple ribbed surface extending in a radial direction normal to an axis of rotation A-A.

12 Claims, 2 Drawing Sheets

(56) References Cited

U.S. PATENT DOCUMENTS

| | | | | |
|---|---|---|---|---|
| 7,985,150 B2 * | 7/2011 | Kamdem | | F16D 3/02 474/166 |
| 8,021,253 B2 * | 9/2011 | Dell | | F16D 3/02 464/57 |
| 8,047,920 B2 * | 11/2011 | Jansen | | F16D 3/52 464/60 |
| 8,132,657 B2 * | 3/2012 | Antchak | | F16D 7/022 192/41 S |
| 8,192,312 B2 * | 6/2012 | Ali | | F16F 15/121 474/94 |
| 8,272,982 B2 * | 9/2012 | Fitz | | F16H 55/36 464/37 |
| 8,419,574 B2 * | 4/2013 | Serkh | | F16F 15/1216 474/94 |
| 8,506,434 B2 * | 8/2013 | Harvey | | F16D 47/02 192/41 R |
| 8,534,438 B2 * | 9/2013 | Antchak | | F16D 41/206 192/113.32 |
| 8,602,928 B2 * | 12/2013 | Serkh | | F16D 3/12 474/70 |
| 8,678,157 B2 * | 3/2014 | Ward | | F16D 7/022 192/41 R |
| 8,789,670 B2 * | 7/2014 | Antchak | | F16D 7/022 192/212 |
| 8,813,932 B2 * | 8/2014 | Ward | | F16D 41/206 192/41 S |
| RE45,156 E * | 9/2014 | Jansen | | F16D 3/52 464/60 |
| 8,820,503 B2 * | 9/2014 | Schneider | | F16D 41/206 192/41 S |
| 8,888,622 B2 * | 11/2014 | Chen | | F16D 41/206 474/74 |
| 8,931,610 B2 * | 1/2015 | Serkh | | F16D 41/206 192/41 S |
| 8,951,153 B2 * | 2/2015 | Ishida | | F16D 43/18 474/74 |
| 9,033,832 B1 * | 5/2015 | Serkh | | F16F 15/126 474/70 |
| 9,046,133 B2 * | 6/2015 | Marion | | B60K 25/02 |
| 9,169,914 B2 * | 10/2015 | Serkh | | F16H 55/36 |
| 9,206,892 B2 * | 12/2015 | Serkh | | F16H 55/36 |
| 2004/0014540 A1 * | 1/2004 | Dell | | F16H 55/36 474/70 |
| 2006/0264280 A1 * | 11/2006 | Dell | | F16H 55/36 474/70 |
| 2007/0179000 A1 * | 8/2007 | Damson | | F16D 3/68 474/94 |
| 2009/0197719 A1 * | 8/2009 | Ali | | F16D 7/021 474/94 |
| 2009/0305828 A1 * | 12/2009 | Rasche | | F02B 67/06 474/94 |
| 2011/0245000 A1 * | 10/2011 | Serkh | | F16F 15/1216 474/94 |
| 2011/0256968 A1 * | 10/2011 | Serkh | | F16D 3/12 474/70 |
| 2012/0000446 A1 * | 1/2012 | Venton-Walters | | F16D 1/101 123/564 |
| 2012/0135830 A1 * | 5/2012 | Burke | | B62M 9/02 474/94 |
| 2013/0150191 A1 | 6/2013 | Ishida | | |
| 2013/0237351 A1 * | 9/2013 | Marion | | B60K 25/02 474/70 |

\* cited by examiner

ISOLATING PULLEY

FIELD OF THE INVENTION

The invention relates to an isolating pulley, and more particularly, an isolating pulley comprising a friction member engaged between the spring carrier and the hub, the friction member comprising a first multiple ribbed surface to engage the spring carrier and a second multiple ribbed surface to engage the hub, each extending radially from an axis of rotation.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. application serial No. 2013/0150191 which discloses a drive pulley structure has a cylindrical pulley member, a hub structure that is provided inside the pulley member so as to rotate relative to the pulley member, a coil spring that is fixed to the hub structure, a tapering which has a conical round surface as of a cone whose axis is made up of a rotational axis J of the hub structure, and a frictionmember that is inserted to be interposed between the conical round surface of the tapering and the pulley member, and the coil spring is inserted to be interposed in place while being compressed in the direction of the rotational axis of the hub structure, the tapering, the frictionmember and the pulley member being brought into press contact with each other by virtue of a restoring force P of the coil spring.

What is needed is an isolating pulley comprising a friction member engaged between the spring carrier and the hub, the friction member comprising a first multiple ribbed surface to engage the spring carrier and a second multiple ribbed surface to engage the hub, each extending radially from an axis of rotation. The present invention meets this need.

SUMMARY OF THE INVENTION

The primary aspect of the invention is an isolating pulley comprising a friction member engaged between the spring carrier and the hub, the friction member comprising a first multiple ribbed surface to engage the spring carrier and a second multiple ribbed surface to engage the hub, each extending radially from an axis of rotation.

Other aspects of the invention will be pointed out or made obvious by the following description of the invention and the accompanying drawings.

The invention comprises an isolating pulley comprising a hub, a pulley journalled to the hub, a spring carrier journalled to the hub, a torsion spring engaged between the pulley and the spring carrier, a friction member engaged between the spring carrier and the hub, the friction member comprising a first multiple ribbed surface to engage the spring carrier and a second multiple ribbed surface to engage the hub, and the first multiple ribbed surface and the second multiple ribbed surface extending in a radial direction normal to an axis of rotation A-A.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
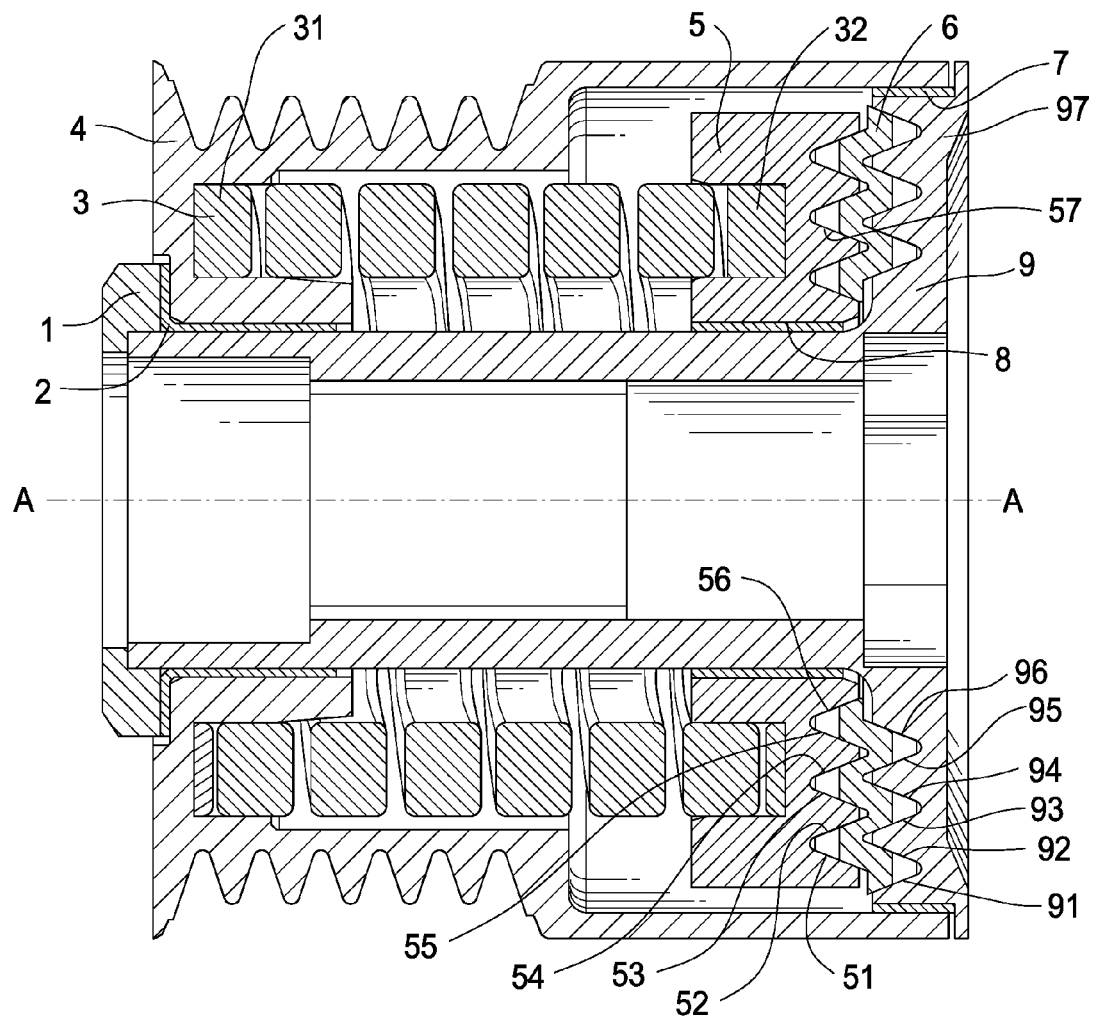
FIG. 1 is a cross-sectional view of the device.

FIG. 1 is a cross-sectional view of the device. The device comprises a hub 9. Pulley 4 is journalled to and thereby rotatable about hub 9 on bush 2 and bush 7. Torsion spring 3 is engaged to pulley 4 and spring carrier 5. Spring carrier 5 is journalled to and thereby rotatably engaged with hub 9 through bush 8. Friction member 6 is frictionally disposed between with hub 9 and spring carrier 5. Cap 1 retains pulley 4 on hub 9.

Pulley 4 directly interfaces with a belt to drive the device. Power flows from pulley 4 to one end 31 of torsion spring 3 via an interference fit. Spring 3 is a biasing member that transmits torque and attenuates vibration and provides the isolating function of the device. Spring 3 transmits torque while being driven in an unwinding direction, but may also transmit torque in the winding direction in an alternate embodiment.

The other end 32 of spring 3 is connected to spring carrier 5. Spring carrier 5 has an interference fit to receive end 32 of spring 3. Spring carrier 5 comprises a ribbed profile 57 on the side opposite the receiving portion of spring 3. Spring 3 has a spring rate of approximately 0.36 Nm/degree.

Spring carrier 5 interfaces with friction member 6 through a ribbed profile portion 57, and thereby transmits torque through friction. Surfaces 51, 52, 53, 54, 55, and 56 are the surfaces which frictionally engage spring carrier 5 to friction member 6. Friction member 6 transmits torque to hub 9 through surfaces 91, 92, 93, 94, 95, and 96.

Friction member 6 comprises surfaces 61, 62, 63, 64, 65, 66 to frictioanlly engage surfaces 51, 52, 53, 54, 55, 56. Friction member 6 comprises surfaces 610, 620, 630, 640, 650, 660 to frictionally engage surfaces 91, 92, 93, 94, 95, 96. Surfaces 91, 92, 93, 94, 95, 96 are disposed on radially extending flange 97.

The ribbed surfaces on the spring carrier 5, friction member 6 and hub 9 all extend in a radial direction normal to and outward from the axis of rotation A-A of hub 9.

Further, the ribbed surfaces of the spring carrier 5, friction member 6 and hub 9 each comprise the form of one or more concentric rings centered about the axis of rotataion A-A.

Hub 9 is directly connected to drive a driven component, such as an alternator (not shown).

Figure 2:
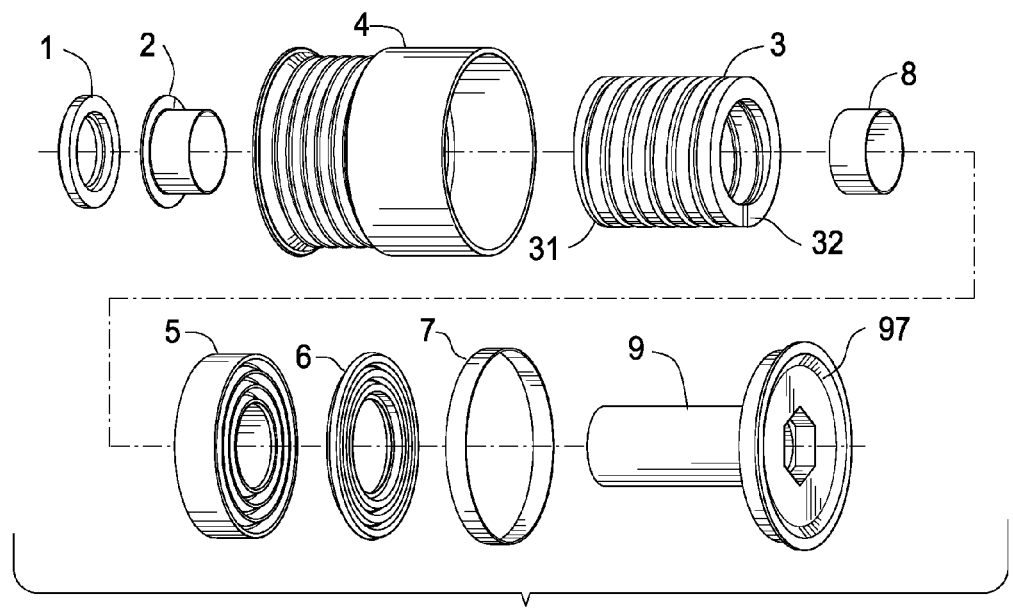
FIG. 2 is an exploded view of the device.

FIG. 2 is an exploded view of the device.

Figure 3:
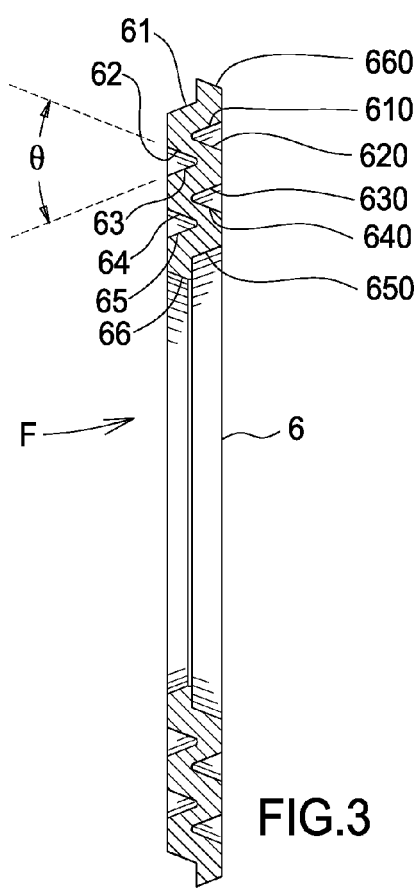
FIG. 3 is a detail of the friction member.

FIG. 3 is a detail of the friction member. It is known that the rated peak torque of an alternator is often less than the peak torque observed when starting the engine. For example, a typical automotive alternator will have a rated peak torque of 12 Nm, an inertia of 0.00030 kg m$^2$, and an acceleration rate at the alternator of 100,000 rad/s$^2$ during engine starting. However, at engine start-up the device could be exposed to 30

Nm of torque, but would not receive such a high torque spike during any other operating conditions.

To avoid use of torsion spring that can handle a elevated starting torque, the inventive device uses a friction member clutch to protect torsion spring 3 from receiving a torque spike in excess of a predetermined level. Friction member 6 is pressed or biased by axial compression of torsion spring 3 against hub flange 97, thereby inparting a normal force "F" which enables transmission of torque from pulley 4 to hub 9. Normal force "F" is in the range of approximately 100 N to 200 N. The embodiment described herein comprises a force "F" of approxiamtely 140 N by way of example.

The use of ribbed surfaces on friction member 6 maximizes the number of surfaces and thereby surface area which eliminates the need for multiple friction disks or a radially larger engaging surface. Rib angle Θ ensures that the friction member 6 smoothly engages and disengages to avoid "grabbing" or stick-slip.

An example comprises:

Assumptions

μstatic=0.5

Applied force (F) from spring: 140 N

Ribbed profile with six 6 conical surfaces on each side of friction member 6

$$T = \frac{2}{3}\left(\frac{\mu F(ro^3 - ri^3)}{(ro^2 - ri^2)}\right)\left(\frac{1}{\sin\frac{\theta}{2}}\right)$$

The equation is for one surface, for example, surface 61. Slip occurs when $T_{Input} > T_{Friction\ Member}$.

Example variables are noted in the Table below.

| | Surface 1 | | Surface 2 | | Surface 3 | | Surface 4 | | Surface 5 | | Surface 6 | | Total Torque |
|---|---|---|---|---|---|---|---|---|---|---|---|---|---|
| | | | | | Spring Side (Spring 3) | | | | | | | | |
| Ro | 0.01222 | ro | 0.01453 | ro | 0.01578 | Ro | 0.01809 | ro | 0.01934 | ro | 0.02177 | | |
| Ri | 0.01179015 | ri | 0.01422 | ri | 0.01547 | Ri | 0.01778 | ri | 0.01903 | ri | 0.02134 | | |
| T (Nm) | 2.446557741 | T (Nm) | 2.929344 | T (Nm) | 3.18403 | T (Nm) | 3.654749 | T (Nm) | 3.909438 | T (Nm) | 4.392433 | | 20.5165514 |
| | | | | | Hub Side (Hub 9) | | | | | | | | |
| Ro | 0.01372 | ro | 0.01603 | ro | 0.01728 | ro | 0.01959 | ro | 0.02084 | ro | 0.02327 | | |
| Ri | 0.0132901 | ri | 0.01572 | ri | 0.01697 | ri | 0.01928 | ri | 0.02053 | ri | 0.02284 | | |
| T (Nm) | 2.752181452 | T (Nm) | 3.234996 | T (Nm) | 3.489673 | T (Nm) | 3.960405 | T (Nm) | 4.215084 | T (Nm) | 4.698086 | | 22.3504267 |

The ribbed profiles can also wedge lock in a manner similar to a cone clutch as shown in Equation 1. The advantage is that it is impractical to use more than one surface with a cone clutch and cone clutches tend to "grab" and often need a mechanism to disengage the clutch. On the other hand a ribbed profile with a relatively large wedge (rib) angle Θ of approximately 20° and multiple rib surfaces has the ability to smoothly engage, disengage, and permit gross slip between the spring carrier 5, friction member 6, and hub 9 when required. Rib angle Θ may be in the range of approximately 18° to 22°.

$$T = \frac{2}{3}\left(\frac{\mu F(ro^3 - ri^3)}{(ro^2 - ri^2)}\right)\left(\frac{1}{\sin\frac{\theta}{2}}\right) \quad \text{Equation 1}$$

$\mu$: Coefficient of friction $F$: Applied normal force $r_0$: Outer radius $r_i$: Inner radius $\frac{\theta}{2}$: Wedge angle Friction member 6 may comprise any suitable frictional material, including plastic, composites, paper, resin bonded materials, elestomeric materials, and sintered materials. The coefficient of friction between friction member 6 and spring carrier 5 is greater than approximately 0.17. The instant embodiment having a coefficient of friction of approximately 0.50. The coefficient of friction between the friction member 6 and hub 9 is greater than approximately 0.17. The instant embodiment having a coefficient of friction of approximately 0.50.

Although a form of the invention has been described herein, it will be obvious to those skilled in the art that variations may be made in the construction and relation of parts without departing from the spirit and scope of the invention described herein.

I claim:

1. An isolating pulley comprising:
a hub;
a pulley journalled to the hub;
a spring carrier journalled to the hub;
a torsion spring engaged between the pulley and the spring carrier;
a friction member engaged between the spring carrier and the hub, the friction member comprising a first multiple ribbed surface to engage the spring carrier and a second multiple ribbed surface to engage the hub; and
the first multiple ribbed surface and the second multiple ribbed surface extending in a radial direction normal to an axis of rotation A-A.

2. The isolating pulley as in claim 1, wherein each of the first multiple ribbed surface and the second multiple ribbed surface comprises one or more rings concentric about an axis of rotation A-A.

3. The isolating pulley as in claim 2, wherein the torsion spring is axially compressed between the pulley and hub.

4. The isolating pulley as in claim 3, wherein the torsion spring is loaded in an unwinding direction.

5. An isolating pulley comprising:
a hub;
a pulley journalled to the hub;
a spring carrier journalled to the hub;
a torsion spring engaged between the pulley and the spring carrier;

a friction member engaged between the spring carrier and the hub, the friction member comprising a multiple ribbed surface to engage a spring carrier multiple ribbed surface; and the multiple ribbed surface extending in a radial direction normal to an axis of rotation A-A.

6. The isolating pulley as in claim 5, wherein the multiple ribbed surface comprises one or more rings concentric about an axis of rotation A-A.

7. The isolating pulley as in claim 6, wherein the torsion spring is axially compressed between the pulley and hub.

8. The isolating pulley as in claim 7, wherein the torsion spring is loaded in an unwinding direction.

9. An isolating pulley comprising:

a hub;

a pulley journalled to the hub;

a spring carrier journalled to the hub;

a torsion spring engaged between the pulley and the spring carrier;

a friction member engaged between the spring carrier and the hub, the friction member comprising a multiple ribbed surface to engage a hub multiple ribbed surface; and the multiple ribbed surface extending in a radial direction normal to an axis of rotation A-A.

10. The isolating pulley as in claim 9, wherein the multiple ribbed surface comprises one or more rings concentric about an axis of rotation A-A.

11. The isolating pulley as in claim 10, wherein the torsion spring is axially compressed between the pulley and hub.

12. The isolating pulley as in claim 11, wherein the torsion spring is loaded in an unwinding direction.

* * * * *